(12) United States Patent
Turpin et al.

(10) Patent No.: US 7,667,940 B2
(45) Date of Patent: Feb. 23, 2010

(54) POWER SWITCHING APPARATUS WITH OPEN-LOAD DETECTION

(75) Inventors: Pierre Turpin, Toulouse (FR); Laurent Guillott, Seysses (FR); Erwan Hemon, Goyrans (FR); Uli Joos, Nonnenhorn (DE); Josef Schnell, Wasserburg (DE)

(73) Assignee: Freescale Semiconductor, Inc., Austin, TX (US)

( * ) Notice: Subject to any disclaimer, the term of this patent is extended or adjusted under 35 U.S.C. 154(b) by 439 days.

(21) Appl. No.: 11/576,134

(22) PCT Filed: Nov. 26, 2004

(86) PCT No.: PCT/EP2004/014896

§ 371 (c)(1),
(2), (4) Date: Mar. 27, 2007

(87) PCT Pub. No.: WO2006/056232

PCT Pub. Date: Jun. 1, 2006

(65) Prior Publication Data

US 2008/0259515 A1    Oct. 23, 2008

(51) Int. Cl.
*H02H 3/08* (2006.01)
(52) U.S. Cl. ..................................... 361/93.1
(58) Field of Classification Search ............... 361/93.1
See application file for complete search history.

(56) References Cited

U.S. PATENT DOCUMENTS

| | | | |
|---|---|---|---|
| 5,164,659 A * | 11/1992 | Schultz et al. | 323/351 |
| 5,438,286 A | 8/1995 | Pavlin et al. | |
| 5,774,321 A * | 6/1998 | Kim et al. | 361/94 |
| 5,920,452 A * | 7/1999 | Sullivan | 361/101 |
| 6,456,156 B1 * | 9/2002 | Frey et al. | 327/541 |

FOREIGN PATENT DOCUMENTS

| | | |
|---|---|---|
| DE | 19737628 C1 | 1/1999 |
| DE | 19705339 C2 | 11/2001 |
| EP | 0404692 B1 | 8/1993 |
| EP | 0493238 B1 | 6/1995 |
| EP | 0945950 B1 | 7/2003 |
| EP | 0743529 B1 | 7/2004 |
| JP | 06104711 A * | 4/1994 |

* cited by examiner

*Primary Examiner*—Stephen W Jackson
*Assistant Examiner*—Ann T Hoang

(57) ABSTRACT

Power switching apparatus comprising switch means having a control terminal and output terminals for connection in series between a power supply and a load. The switch means is responsive to a control signal applied to the control terminal to switch between an ON-state in which it supplies power supply current from the power supply through the output terminals to the load and an OFF-state in which it interrupts the supply of power through the output terminals to the load. The apparatus includes detection means for detecting an open-load condition of the load at least during the ON-state of the switch means, comprising detection control means operable in the ON-state of the switch means for modifying the control signal so as to start switching the switch means to the OFF-state during a lapse of time substantially less than the time required for the switch means to reach the OFF-state and for restoring the control signal to a value corresponding to the ON-state at or before the end of the lapse of time, and comparator means responsive to variation of voltage at the output terminals during the lapse of time. The duration of the variation of voltage during the open-load detection is too short and its magnitude too small for the variation of load current to be perceptible, notably in the case where the load is a lamp.

20 Claims, 5 Drawing Sheets

POWER SWITCHING APPARATUS WITH OPEN-LOAD DETECTION

FIELD OF THE INVENTION

This invention relates to power switching apparatus with open-load detection and more particularly with capability for detecting an open-load condition in the ON-state.

BACKGROUND OF THE INVENTION

Power switching apparatus with open-load detection, referred to as a 'smart power switch', is used in many applications, including automotive equipment, especially to control vehicle lighting, for example. The present invention is particularly, but not exclusively, usable in such applications.

Integrated smart power switches use different strategies to detect the disconnection of an output load.

The simplest strategy is to monitor the status of the output during the OFF-state. In a known system of this kind, a very small test current is fed to the output line and the voltage across the load is monitored by a voltage comparator. With a normal load, the low impedance of the load ties the output voltage close to ground level (in the case of a high-side switch), in case of load disconnection or open circuit the output is tied to high voltage level by the current source.

The disadvantage of this solution is that it is not acceptable for detection of open-load during the ON-state of the switch, which is a particular disadvantage in many applications, such as switching automotive lighting, for example incandescent bulbs or light-emitting diodes ('LED's). To generate an information using this type of solution during the ON-state, the load must be switched OFF temporarily, which is visible as a flickering of the lamp. Even measurement during the OFF-state of the load can only be performed when the output is energised at least at low current levels but which may also generate unacceptable visible light, especially when using LED light sources.

Another technique to monitor a load disconnection or open circuit condition is to measure the load current in the switch. This can be done with a dedicated magnetic coupler or a shunt resistor based current measurement circuit. However, such circuits introduce not only additional cost and space requirements but also an additional voltage drop.

Another solution to measure the load current in the switch, especially where the switch comprises a MOS transistor is to mirror the output current during the ON-state by a regulated current source. This common and effective solution suffers mainly from a poor precision of the circuit recopy at small output currents. When the voltage drop across the switch is of the same magnitude as the offset of the regulating amplifier the error of the circuit can exceed 100% and adequate current measurement is no more possible.

Fast open-load detection is often required during ON state to get a quick reaction in case of dead bulbs on a car for example in order to be able to react by substituting emergency lighting for the normal lighting with a minimum of disruption. The open-load current detection threshold must be lower than the minimum acceptable current for a normal load. In the case of a standard driver used to drive a wide spread of loads this minimum current becomes difficult to measure. For example: A MOSFET (metal-oxide field-effect transistor) switch driver can be designed in terms of the drain-source resistance Rdson in the On-state to drive a 27 Watts incandescent bulb (Rdson: 40 mOhm typical, 20 mOhm minimum, for DC current of 2 amps from a nominally 12 volt power supply).

However, incandescent bulbs are more and more being replaced by an array of LEDs with minimum current around 100 mA. It is desirable for the same switch and driver to be used for both incandescent bulbs and LEDs so that the open-load threshold current has to be adjusted below this 100 mA. Measuring 100 mA on a minimum Rdson of 20 mOhm (during ON state) means an absolute signal of 2 mV to be measured in a harsh environment (fast transients on supply), which is simply not a realistic solution in most applications of this kind.

SUMMARY OF THE INVENTION

The present invention provides power switching apparatus as described in the accompanying claims.

DETAILED DESCRIPTION OF THE PREFERRED EMBODIMENTS

Figure 1:
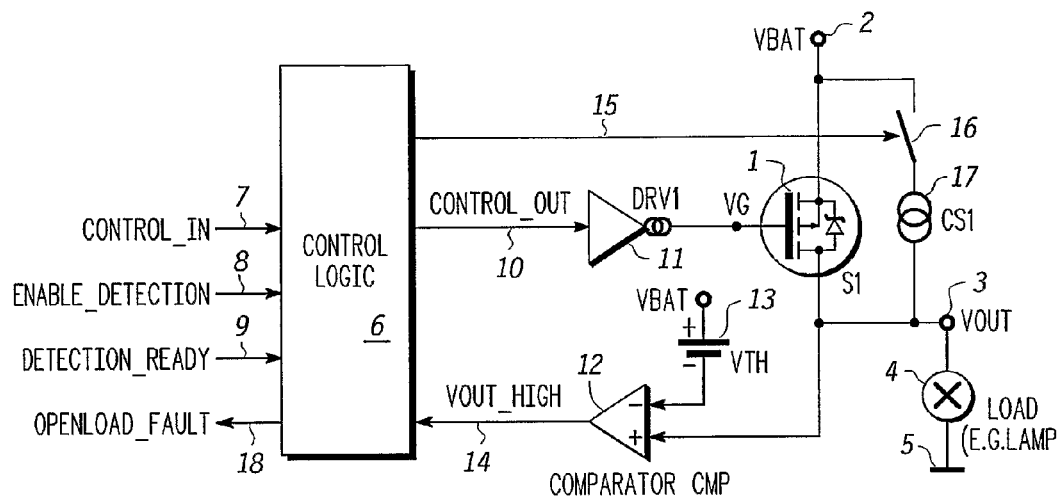
FIG. 1 is a schematic block diagram of a smart power switch in accordance with one embodiment of the invention, given by way of example.

The power switching apparatus shown in FIG. 1 comprises a switch 1 in the form of a MOSFET (metal-oxide field-effect transistor) controlled by a control voltage VG applied to a gate and a drain and source connected respectively to output terminals 2 and 3. In use, the output terminals 2 and 3 are connected in series between a power supply (not shown), applying a voltage Vbat to the terminal 2, and a load 4 connected between the output terminal 3 and ground 5. This embodiment of the invention is particularly applicable to automotive equipment and will be described with reference to such an application, notably where the load consists of one or more lamps, such as an incandescent bulb or LED (light-emitting diode) and the power supply is a DC voltage provided by an accumulator and alternator. However it will be appreciated that the invention may also be used in other applications.

The apparatus comprises a control logic unit 6 that receives a Control_in signal at an input 7, an Enable_detection signal at an input 8 and a Detection_ready signal at an input 9 and applies a Control_out signal at an output 10 to a driver 11, including a charge pump, an amplifier and an inverter, that applies the signal VG to the gate of the MOSFET switch 1.

In operation, the Control_in signal at 7 commands the ON- and OFF-states of the switch 1. Assertion of the Control_in signal at 7 to its ON value causes the driver 11 to apply a voltage to the gate of the switch 1 that is substantially higher than the voltage Vbat that the power supply normally applies to the terminal 2, so that the MOSFET 1 is driven into saturation in the ON-state with low drain-source resistance Rdson. In the ON-state, the switch 1 supplies power supply current from the power supply through the output terminals 2 and 3 to the load 4. De-assertion of the Control_in signal at 7 causes the driver 11 to pull the voltage of the gate of the switch 1 down to ground so that in the OFF-state the MOSFET 1 interrupts the supply of power through the output terminals to the load.

The smart power switch also includes a detector for detecting an open-load condition of the load 4, due to a faulty connection between the terminal 3 and the load or due to a defective load, for example. The detector is operational during the ON-state of the switch 1, and also during its OFF-state. In the embodiment of the invention shown in FIG. 1, the detector comprises a comparator 12 having one differential input connected to receive the output voltage Vout from the output terminal 3 and another differential input connected to the terminal 2 through a voltage source 13 that applies a voltage Vth, so that the comparator produces an output signal Vout_high that is asserted while Vout is higher that Vbat−Vth. Vbat−Vth represents therefore a detection threshold for the detector. In an automotive equipment application, if the nominal battery voltage Vbat is 12 volts, in this embodiment of the invention, the threshold voltage may be set with Vth equal to 0.5 volts, for example. The detector also includes a Detection_current_control signal 15 from the control unit 6 that closes a detection current switch 16 connected in series with a detection current source 17 between the terminals 2 and 3. In another embodiment of the invention, the current source 17 is replaced by a resistor.

Figure 2:
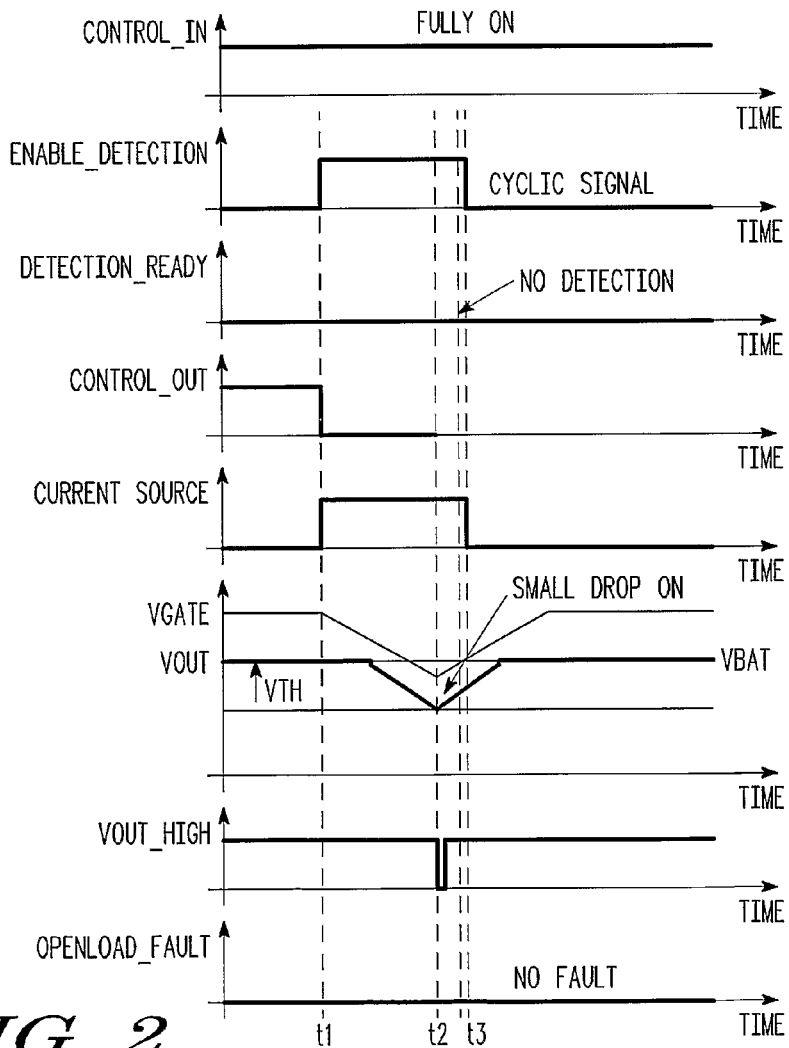
FIG. 2 is a schematic diagram of the variation with time of signals appearing in operation of the apparatus of FIG. 1 in a case of detection of a normal load condition during an ON-state of the apparatus.
Figure 3:
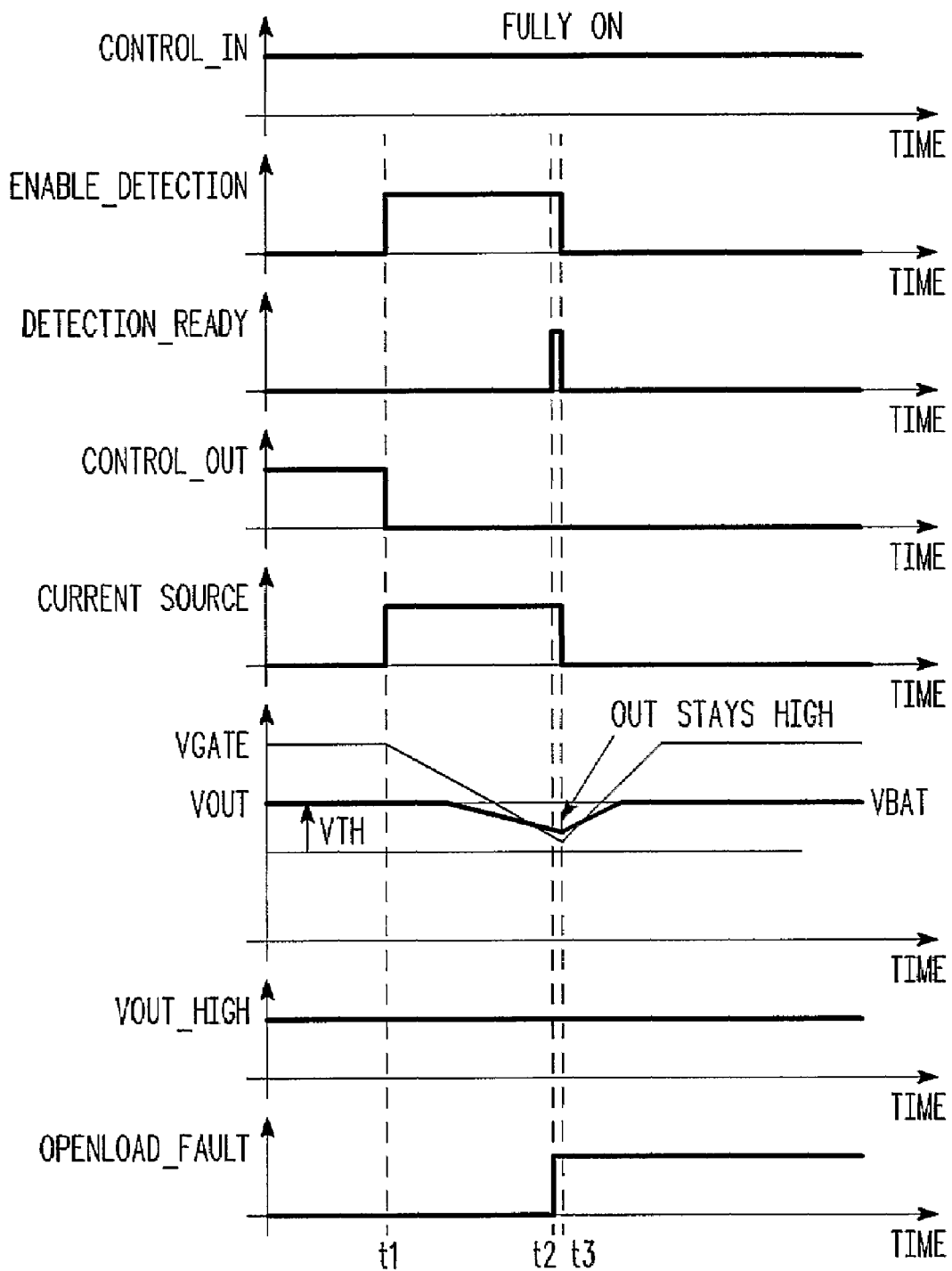
FIG. 3 is a schematic diagram of the variation with time of signals appearing in operation of the apparatus of FIG. 1 in a case of detection of a open-load condition during an ON-state of the apparatus.

In operation in the ON-state of the switch 1, the Enable_detection signal at input 8 is asserted repeatedly to start each detection cycle, for example at intervals of the order of 100 msec. The control logic unit 6 responds to assertion of the Enable_detection signal by de-asserting the Control_out signal at 10 so that the driver 11 supplies a current to the gate of the MOSFET 1 pulling the gate voltage Vgate down towards ground temporarily. The current supplied at this time may be equal to the current supplied by the driver 11 during normal turn-OFF of the switch or may be a smaller current; in this embodiment of the invention, the current supplied to the gate is of the order of 100 μA. As shown in FIGS. 2 and 3, the gate voltage Vgate slews downwards progressively due to the capacitance of the gate, for example with a slew rate of the order of 0.3V/μsec. Initially in the ON-state, the resistance Rdson of the switch 1 (for example of the order of 20 mOhm) is much lower than the resistance of the load 4 (for example, of the order of 10 Ohms for an incandescent bulb and 1 Ohm for an LED). As the gate voltage reduces towards or below the source voltage, the MOSFET 1 starts to de-saturate and its resistance becomes substantial.

Simultaneously, as shown in FIGS. 2 and 3, the control logic unit 6 asserts the Detection_current_control signal on 15, closing detection current switch 16, so that the current source 17 supplies a detection current between the terminals 2 and 3, the detection current being significantly lower than the normal ON-state current of the load 4; for example, in one embodiment of the invention, the detection current may be of the order of 10 mA, whereas the normal ON-state current of the load 4 is of the order of 1 A for an incandescent bulb and 100 mA for an LED.

When the gate voltage Vgate reaches the gate-source threshold voltage, the output voltage Vout applied to the load at the terminal 3 starts to reduce also and its rate of reduction depends on the impedance of the load 4 relative to the impedance of the current source (or resistance) 17. In particular, if the load 4 presents a normal resistance, the rate of fall of Vout is significantly faster than if the load 4 presents a high resistance, especially if it is open-circuit.

The detector of this embodiment of the invention enables the variation in voltage at the output terminal 3 to be sensed during a lapse of time significantly shorter than the shortest time for which a variation in luminosity is perceptible to the human eye (approximately 40 msec) and in this embodiment is shorter than 100 μsec.

Moreover the time taken for detection is substantially less than the time required for the switch 1 to reach its OFF-state, so that the variation in the output voltage Vout due to the open-load detection function is only a small percentage of its normal value. In this embodiment, the maximum variation due to the open-load detection is limited to less than 10% of the nominal operating power supply voltage. In fact, it has been found that open-load detection can be performed satisfactorily without waiting for the switch 1 to reach the OFF-state, which would have lengthened the detection cycle unacceptably.

Once the detection has been performed, the switch 1 is turned back ON immediately by restoring the Control_out signal at 10 to a value corresponding to the ON-state at or before the end of the detection lapse of time.

The Detection_ready signal controls the maximum detection duration. In this embodiment of the invention, if there is an open load condition, as shown in FIG. 3, the detection cycle starts at a time t1 triggered by the Enable_detection signal at 8 and the Detection_ready signal is asserted at a time t2, after a predetermined interval of approximately 50 μsec, to define a brief detection window by enabling response of the control unit 6 to assertion of the output Vout_high of the comparator 12. If the output voltage Vout at terminal 3 is higher than Vbat−Vth during the detection window, as shown in FIG. 3, corresponding to an open-load condition, the output Vout_high of the comparator 12 is still asserted and the control logic unit 6 latches a signal Openload_fault at an output 18 to an asserted value. The control unit simultaneously restores the Control_out signal at 10 to a value corresponding to the ON-state, turning the switch 1 fully on and opens the detection current switch 16, to reset to the normal operational condition outside the detection period.

If the load 4 is normal, the operation of the detection can be the same, with the control unit responding to the output Vout_high of the comparator 12 only during the detection window. However, in this embodiment of the invention the detection of a normal load condition immediately triggers the termination of the detection cycle, so as to minimise its duration. As shown in FIG. 2, if there is a normal load condition, the output Vout_high of comparator 12 is de-asserted before time t2 when Vout reaches Vbat−Vth, due to the more rapid reduction in voltage for a normal load than for an open-load. The Detection_ready signal on input 9 is only generated to define the detection window if the output Vout_high of comparator 12 is asserted. Especially, de-assertion of the output Vout_high of comparator 12 before time t2 when Vout reaches Vbat−Vth causes the control unit 6 to turn the switch 1 back ON immediately by restoring the Control_out signal at 10 to a value corresponding to the ON-state.

Figure 4:
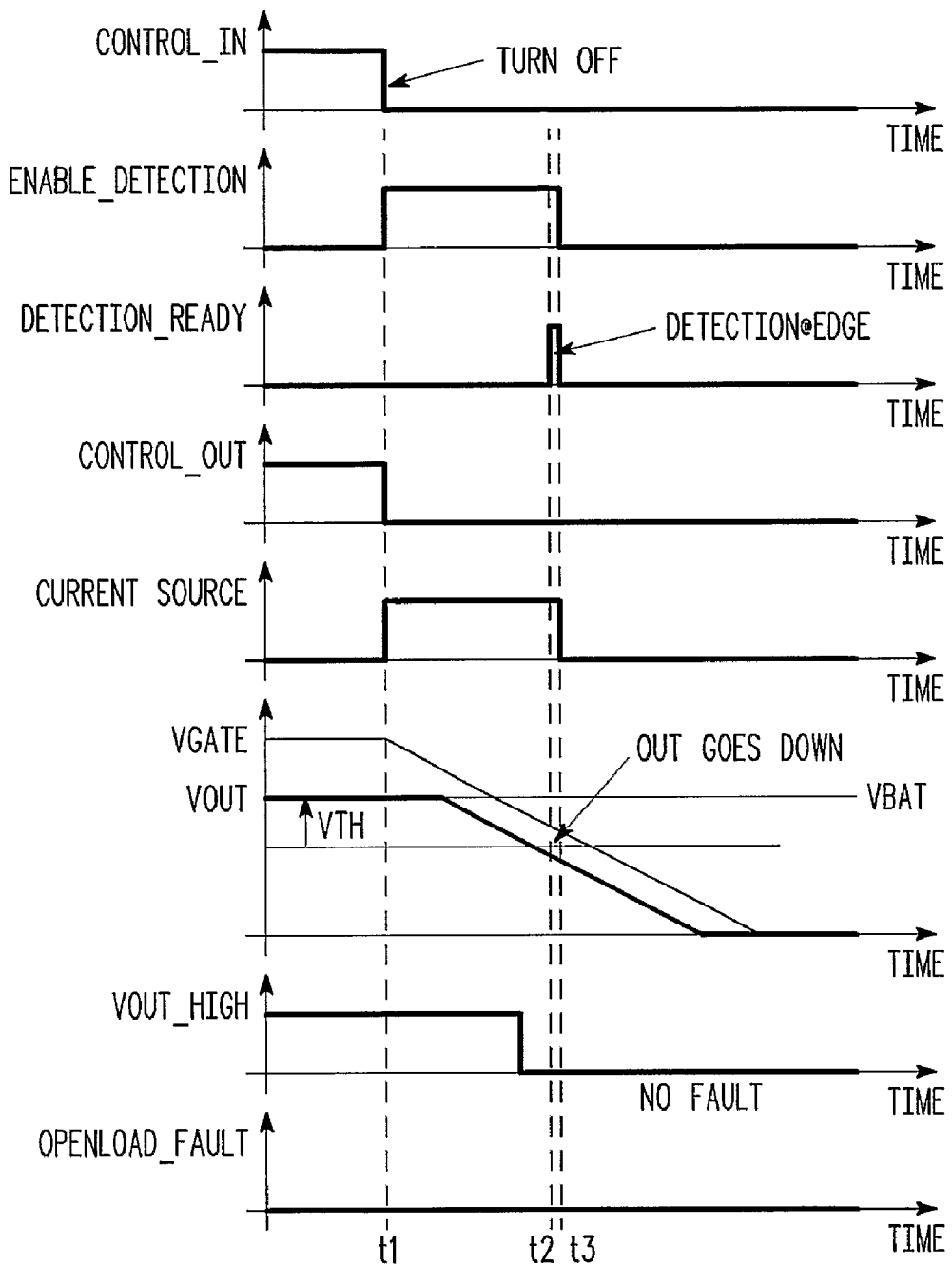
FIG. 4 is a schematic diagram of the variation with time of signals appearing in operation of the apparatus of FIG. 1 in a case of detection of a normal load condition at the trailing edge of a power pulse.
Figure 5:
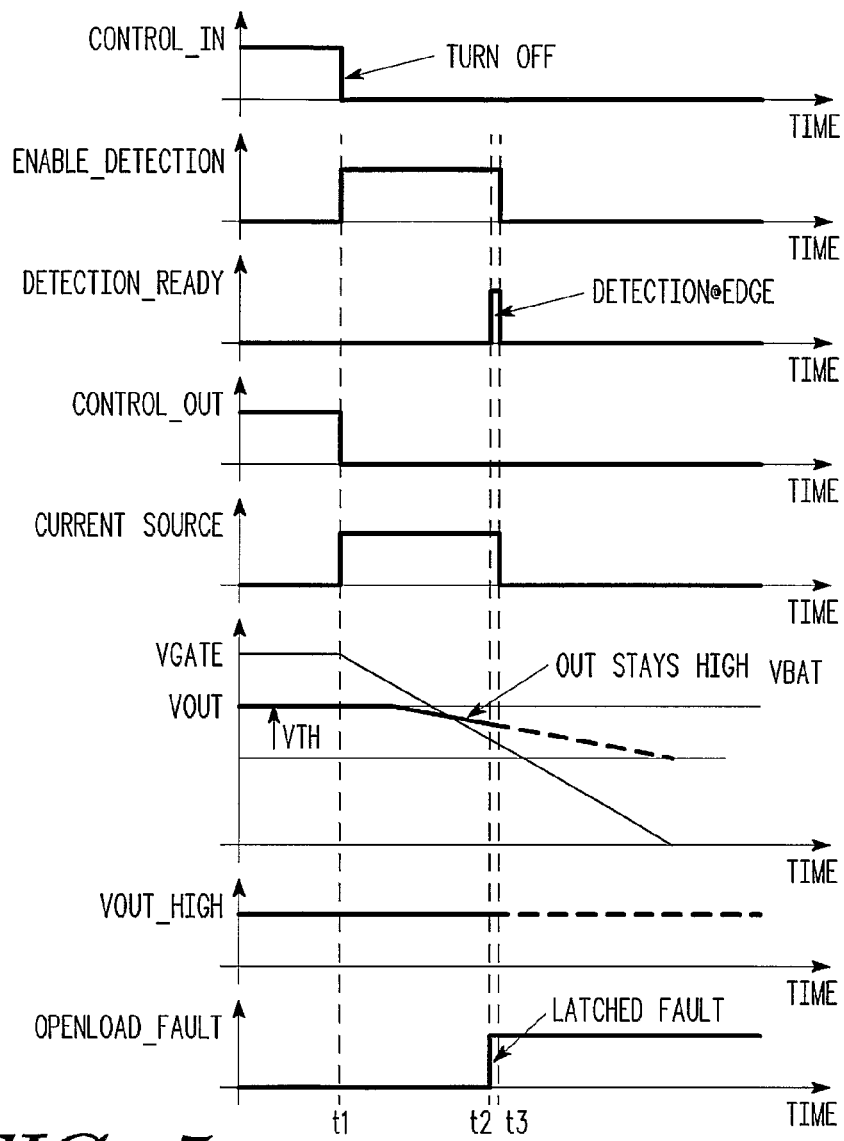
FIG. 5 is a schematic diagram of the variation with time of signals appearing in operation of the apparatus of FIG. 1 in a case of detection of a open-load condition at the trailing edge of a power pulse.

During certain power supply systems, the power supply current is pulsed with a controllable pulse width. This feature may be used for various functions, for example to compensate variations in the power supply voltage (an automotive power supply may vary by more than plus or minus 25%) or to provide emergency functioning. The repetition rate of the pulse is substantially slower than the detection cycle of the present invention (while still being faster than the fastest repetition rate perceptible to the human eye). Accordingly, the open-load detection of the present invention is normally able to function several times during the ON-state of a single power pulse. However, in some circumstance, the pulse width may be very short, for example even as little as 2%, and the operation of open-load detection would be hindered in these circumstances if it is not synchronised with the pulse. The open-load detection of this embodiment of the present invention is arranged to function during the turn-OFF phase of the pulse-width modulation, as shown in FIGS. 4 and 5.

Open-load detection during the turn-OFF phase differs from detection during the ON-state described above in that the detection cycle is triggered by the Control_in signal at 7 being de-asserted and the Enable_detection signal at input 8 being asserted to start the detection cycle. As in the ON-state, the control logic unit 6 responds to assertion of the Enable_detection signal by modifying the Control_out signal at 10 so that the driver 11 supplies a current to the gate of the MOSFET 1 pulling the gate voltage Vgate down towards ground. As shown in FIGS. 4 and 5, the gate voltage Vgate slews downwards progressively, the MOSFET 1 starts to de-saturate and its resistance becomes substantial. The control logic unit 6 asserts the Detection_current_control signal on 15, closing detection current switch 16, so that the current source 17 supplies a detection current between the terminals 2 and 3.

As in the ON-state, when the gate voltage Vgate goes below the gate-source threshold voltage, the output voltage Vout applied to the load at the terminal 3 starts to reduce also and its rate of reduction is significantly faster than if the load 4 presents a high resistance, especially if it is open-circuit. However for detection during turn-OFF, the control unit 6 does not turn the switch 1 back ON once the detection has been performed and the Control_out signal at 10 remains at a value corresponding to the OFF-state even after the end of the detection period. Accordingly, the gate voltage Vgate is pulled right down to ground, the switch 1 is turned OFF and the output voltage Vout also is reduced progressively to ground.

If there is a normal load condition, whether the control unit responds to the output Vout_high of the comparator 12 only during the detection window or immediately on detection of a normal load condition, the output voltage Vout_high remains de-asserted once the output voltage Vout reaches Vbat−Vth. Assertion of the Detection_ready signal on input 9 is used to open the detection current switch 16 at the end of the detection cycle.

If there is an open-load condition, the output voltage Vout will not have reached Vbat−Vth during the detection window. The output Vout_high of the comparator 12 is still asserted, and remains asserted; the control logic unit 6 latches a signal Openload_fault at the output 18 to an asserted value, as for detection in the ON-state.

Figure 6:
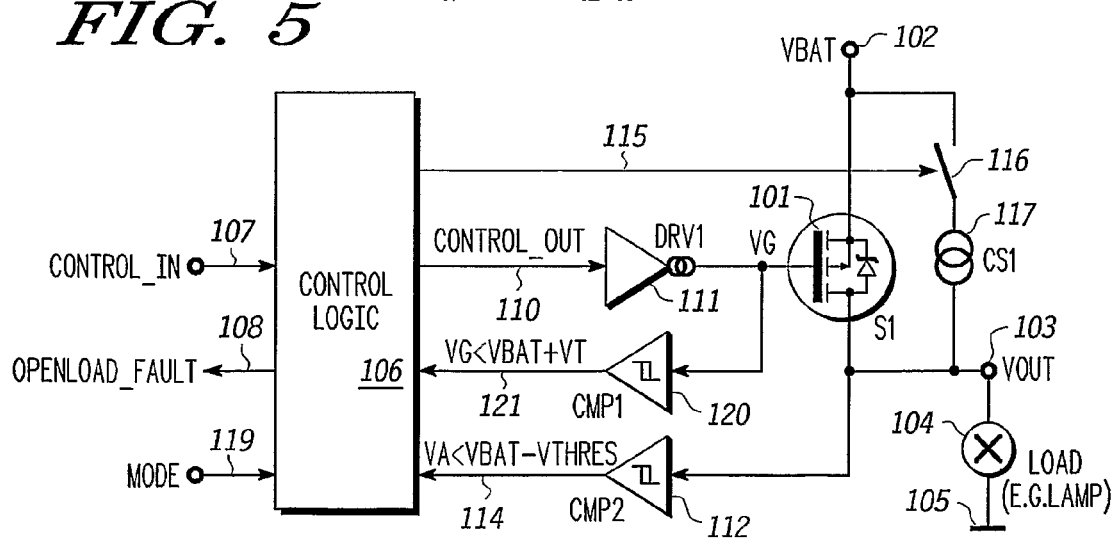
FIG. 6 is a schematic block diagram of a smart power switch in accordance with another embodiment of the invention, given by way of example.
Figure 7:
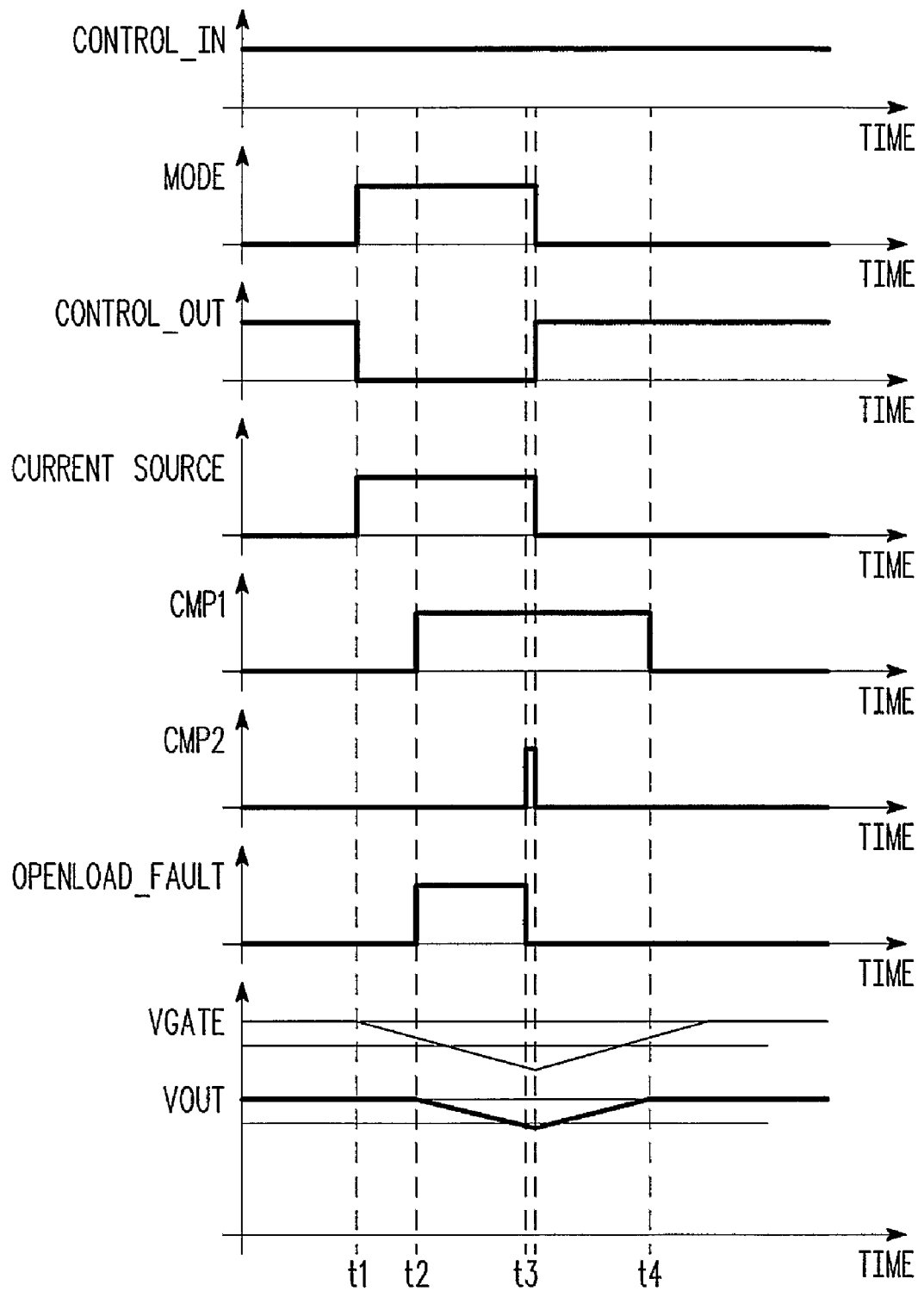
FIG. 7 is a schematic diagram of the variation with time of signals appearing in operation of the apparatus of FIG. 6 during an ON-state of the apparatus.

FIG. 6 shows another embodiment of the invention, similar elements in FIG. 6 bearing the same reference numbers as in FIG. 1, increased by 100. In this embodiment of the invention, instead of the Enable_detection and Detection_ready signals at 8 and 9 defining the detection cycle, it is defined by a Mode signal at an input 119 to the control logic unit 106. A further comparator 120 having a differential input connected to receive the gate voltage Vgate and another differential input that receives a voltage Vbat−Vtg, so that the comparator output asserts while Vgate is higher that Vbat−Vtg. Vtg is chosen to correspond to the gate-source threshold voltage, and assertion of the comparator signal at its output 121 is used to define a start of a detection window for the detector, at which the output voltage Vout at the terminal 103 starts to reduce.

During ON-state detection, the control unit 106 responds to de-assertion of the Mode signal at 119 by re-asserting the Control_out signal at 110 to restore the full ON-state of the switch 101, and by de-asserting the current source control signal at 115 to interrupt the detection current.

The invention claimed is:

1. Power switching apparatus comprising:
a switch having a control terminal and output terminals for connection in series between a power supply and a load, said switch being responsive to a control signal applied to said control terminal to switch between an ON-state in which it supplies power supply current from said power supply through said output terminals to said load and an OFF-state in which it interrupts the supply of power through said output terminals to said load; and
a detection circuit for detecting an open-load condition of said load at least during the ON-state of said switch;
wherein said detection circuit comprises a circuit operable in the ON-state of said switch for modifying said control signal so as to start switching said switch to said OFF-state during a lapse of time substantially less than the time required for said switch to reach said OFF-state and for restoring said control signal to a value corresponding to said ON-state at or before the end of said lapse of time; and
a comparator circuit responsive to variation of voltage at said output terminals during said lapse of time.

2. Power switching apparatus as claimed in claim 1, wherein said detection circuit comprises a detection current supply circuit including a source of current connected in parallel with said output terminals.

3. Power switching apparatus as claimed in claim 2, wherein said detection current supply circuit is disabled outside said lapse of time.

4. Power switching apparatus as claimed in claim 1, wherein said detection circuit comprises a detection current supply circuit including a resistor connected in parallel with said output terminals.

5. Power switching apparatus as claimed in claim 1, wherein said switch comprises a field-effect transistor.

6. Power switching apparatus as claimed in claim 1, wherein said detection control circuit is responsive to said comparator circuit detecting a normal load condition within said lapse of time to restore said control signal to a value corresponding to said ON-state.

7. Power switching apparatus as claimed in claim 6, wherein said comparator circuit is responsive to a voltage across said output terminals reaching a detection threshold value within said lapse of time to generate a signal indicative of a normal load condition.

8. Power switching apparatus as claimed in claim 6, wherein said comparator circuit is responsive to a magnitude of said variation of voltage at the end of said lapse of time indicative of a fault load condition to generate a fault signal.

9. Power switching apparatus as claimed in claim 8, wherein said detection control circuit is responsive to said comparator circuit detecting a fault load condition at the end of said lapse of time to restore said control signal to a value corresponding to said ON-state.

10. Power switching apparatus as claimed in claim 9, wherein said detection circuit is arranged also to detect an open-load condition of said load when said switch circuit switches to the OFF-state, said comparator circuit being responsive to variation of voltage at said output terminals during a period of time after said switch circuit starts switching to said OFF-state.

11. Power switching apparatus as claimed in claim 10 wherein said control signal is arranged to pulse said power supply current with a controllable pulse width.

12. Power switching apparatus as claimed in claim 11, wherein said detection circuit is operable a plurality of times within each pulse of power supply current.

13. Power switching apparatus as claimed in claim 11, wherein said detection circuit is operable at the trailing edges of the pulses of power supply current.

14. Power switching apparatus as claimed in claim 8, for use where said load comprises a light, wherein said lapse of time is arranged to be shorter than 40 msec.

15. Power switching apparatus as claimed in claim 14, wherein said lapse of time is arranged to be shorter than 100 μsec.

16. Power switching apparatus comprising:
   a switch means having a control terminal and output terminals for connection in series between a power supply and a load, said switch means being responsive to a control signal applied to said control terminal to switch between an ON-state in which it supplies power supply current from said power supply through said output terminals to said load and an OFF-state in which it interrupts the supply of power through said output terminals to said load; and detection means for detecting an open-load condition of said load at least during the ON-state of said switch means;

wherein said detection means comprises detection control means operable in the ON-state of said switch means for modifying said control signal so as to start switching said switch means to said OFF-state during a lapse of time substantially less than the time required for said switch means to reach said OFF-state and for restoring said control signal to a value corresponding to said ON-state at or before the end of said lapse of time; and comparator means responsive to variation of voltage at said output terminals during said lapse of time.

17. Power switching apparatus as claimed in claim 16, wherein said detection means comprises detection current supply means including a source of current connected in parallel with said output terminals.

18. Power switching apparatus as claimed in claim 17, wherein said detection current supply means is disabled outside said lapse of time.

19. Power switching apparatus as claimed in claim 16, wherein said detection means comprises detection current supply means including a resistor connected in parallel with said output terminals.

20. Power switching apparatus as claimed in claim 16, wherein said switch means comprises a field-effect transistor.

* * * * *